2,926,157
RESINOUS PRODUCTS FROM FURFURYL ALCOHOL AND DIISOCYANATES

René Leclercq, Woluwe Saint Pierre, and René Paquet, Braine le Comte, Belgium, assignors to Union Chimique Belge, S.A., Brussels, Belgium, a corporation of Belgium No Drawing. Application December 13, 1956
Serial No. 628,000

Claims priority, application Belgium January 6, 1956

3 Claims. (Cl. 260—77.5)

Furfuryl alcohol copolymerizes with many products, such as formaldehyde, dimethylolurea, phenols, melamine, etc. In addition, furfuryl alcohol polymerizes itself in the presence of acid catalysts. The resins thus obtained from furfuryl alcohol have a good resistance to acid or alkaline chemical reagents. However their use is greatly limited on account of their coloration and their poor adhesion to polished metallic surfaces.

On the other hand, the diisocyanates react with diols, like glycols, to give polymers having a linear structure and which are suitable for the manufacture of synthetic fibres.

The present invention relates to a process for the production of resins by reaction of at least one diisocyanate with furfuryl alcohol. In comparison with the polymers obtained from furfuryl alcohol, these new resins have interesting properties, especially on account of their flexibility and their poor coloration. Some of them adhere firmly to polished metallic surfaces.

The diisocyanates suitable for carrying out the present invention have the general formula OCN—R—NCO, in which R is an aliphatic or aromatic bivalent radical. The molecular ratio of diisocyanate to furfuryl alcohol varies between 10:1 and 1:5. A mixture of one or more diisocyanates may also be used. In this case, the molecular ratio of diisocyanates to furfuryl alcohol varies also between 10:1 and 1:5.

The reaction between the diisocyanates and the furfuryl alcohol is very exothermic. A temperature rise of more than 50° C. is observed even if the quantity of reactants is smaller than 100 g. In order to complete the preparation of the resins, it is generally necessary to heat the reaction mixture between 140° and 220° C. The elimination of the volatile products is accelerated by heating in vacuo. When the reaction is carried out in an atmosphere of an inert gas, weakly colored products are obtained. The resins prepared according to the process of the invention may be used as varnishes, adhesives, insoluble cellular products with a high melting point, electric, thermal and accoustic insulators, filling materials, etc.

Example 1

0.4 mole of methylene bis-(4-phenylisocyanate) and 1 mole of furfuryl alcohol are reacted in a flask provided with a stirrer and a reflux condenser. After an induction period of a few minutes, the temperature rises to 85° C. The mixture is heated when the temperature begins to fall. The temperature is then gradually raised to 200° C. in about 2 hours. The flask is connected with a filter pump so as to obtain an absolute pressure of 60 mm. Hg. The mixture is heated for 10 to 15 minutes so as to remove 12 g. of volatile products. Finally, 180 g. of a brownish-yellow resin with a melting point between 60° and 66° C. are obtained.

By dissolving 50 g. of this resin in 50 g. of acetone, a varnish is prepared, which adheres to polished metallic surfaces.

The film thus obtained was subjected to corrosion tests by means of solutions of various acid or alkaline compounds, such as Sodium hydroxide (0–40%)
Sulphuric acid (0–25%)
Hydrochloric acid (0–20%)
Nitric acid (0–15%)

None of these reactants produces a marked destruction after 48 hours' contact at about 20° C.

Example 2

0.2 mole of methylene bis-(4-phenylisocyanate) and 1 mole of furfuryl alcohol are reacted under the same conditions as in Example 1. The temperature rise, due to the exothermicity of the reaction, is 60° C. The reaction is completed by heating at 220° C. under an absolute pressure of 50 mm. Hg. By distillation, 60 g. of volatile products are eliminated. The resin obtain (82 g.) has substantially the same properties as those of Example 1 and a melting point of 62–70° C.

Example 3

0.14 mole of toluene 2,4-diisocyanate and 0.35 mole of furfuryl alcohol are reacted under the same conditions as in Example 1. The preparation is completed as before. 51 g. of a resin (M.P. 35–40° C.) are obtained. This resin is little less colored than that of Example 1.

The varnishes prepared with this resin resist to acid solutions. Their resistance to dilute sodium hydroxide (0–15%) is a little lower, a slight browning of the film is observed.

Example 4

0.25 mole of toluene 2,4-diisocyanate is reacted with 0.25 mole of furfuryl alcohol under the same conditions as in Example 3. The temperature rises spontaneously from 20° to 60° in 13 minutes. The reaction is completed by a gradual heating from 50° to 210° C. in 1 hour. At this temperature a gas evolution is observed and 55–60 g. of a non-plastic cellular product insoluble in most of the solvents (alcohols, ether, actone, dioxane, benzene, etc.) are obtained. This product melts between 235° and 295° C.

Example 5

1 mole of 3,3'-dimethoxy-4,4'-diphenylene-diisocyanate is reacted with 0.1 mole of furfuryl alcohol under the same conditions as in the preceding examples. After 10 hours' heating at 180–200° C., 280 g. of a black resin (M.P. 40–47° C.) are obtained.

Example 6

0.25 mole of furfuryl alcohol is added to 0.25 mole of molten 3,3'-dimethoxy-4,4'-diphenylene-diisocyanate, with stirring and in a nitrogen atmosphere. After 5 hours' reaction at 170° C., 91 g. of a reddish-brown resin (M.P. 88–95° C.) are obtained.

Example 7

0.5 mole of hexamethylene diisocyanate and 0.5 mole of furfuryl alcohol are reacted in a nitrogen atmosphere under the same conditions as in Example 6. After 5 hours heating at 160–170° C., 124 g. of a resinous product having a rubbery appearance and a light-brown coloration are obtained. This product, dissolved in acetone, gives a varnish which, when spread on a copper plate and dried for 2 hours at 170–200° C., adheres strongly to the plate. The latter can be bent several times without cracking. This resin has an electric surface resistance of the order of $10^{13}$ ohm/cm.

This varnish resists especially to:

0–40% sodium hydroxide,
0–30% sulphuric acid,
0–10% hydrochloric acid,
0–7% nitric acid.

None of these reactants produces within the above concentration limits, an appreciable destruction after 72 hours' contact at about 20° C.

*Example 8*

⅓ mole of furfuryl alcohol is reacted with ⅙ mole of hexamethylene diisocyanate and ⅙ mole of toluene 2,4-diisocyanate in a carbon dioxide atmosphere and with agitation. After 2 hours reaction at a temperature between 140 and 170° C., 85 g. of a dark brown resin (M.P. 48–54° C.) are obtained.

We claim:

1. A process for preparing resins which consists essentially of mixing at room temperature furfuryl alcohol with at most two diisocyanates selected from the group consisting of hexamethylene diisocyanate, methylene bis-(4-phenylisocyanate), toluene 2,4-diisocyanate, and 3,3'-dimethoxy-4,4'-diphenylene diisocyanate, from 1 to 5 moles of furfuryl alcohol being added to the mixture for each mole of diisocyanate, said mixture resulting in a reaction, and completing said reaction by heating the mixture to a temperature of from 140° to 220° C.

2. A process according to claim 1 in which the mixture is heated in an atmosphere of an inert gas.

3. A composition comprising a resinous reaction product prepared by a process which consists essentially of mixing at room temperature furfuryl alcohol with at most two diisocyanates selected from the group consisting of hexamethylene diisocyanate, methylene bis-(4-phenylisocyanate), toluene 2,4-diisocyanate, and 3,3'-dimethoxy-4,4'-diphenylene diisocyanate, from 1 to 5 moles of furfuryl alcohol being added to the mixture for each mole of diisocyanate, said mixture resulting in a reaction, and completing said reaction by heating the mixture to a temperature of from 140° to 220° C.

References Cited in the file of this patent

UNITED STATES PATENTS

| | | |
|---|---|---|
| 2,368,426 | Root et al. | Jan. 30, 1945 |
| 2,683,728 | Mastin et al. | July 13, 1954 |

FOREIGN PATENTS

| | | |
|---|---|---|
| 904,089 | France | Feb. 12, 1945 |
| 944,331 | France | Nov. 2, 1948 |